(12) United States Patent
Schueler et al.

(10) Patent No.: US 10,493,873 B2
(45) Date of Patent: Dec. 3, 2019

(54) HARDWARE SYSTEM FOR A VEHICLE SEAT

(71) Applicant: Adient Luxembourg Holding S.à.r.l., Luxembourg (LU)

(72) Inventors: Rolf Schueler, Heiligenhaus (DE); Bernd Bossmanns, Mettmann (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 149 days.

(21) Appl. No.: 15/557,597

(22) PCT Filed: Mar. 7, 2016

(86) PCT No.: PCT/EP2016/054740
§ 371 (c)(1),
(2) Date: Sep. 12, 2017

(87) PCT Pub. No.: WO2016/146414
PCT Pub. Date: Sep. 22, 2016

(65) Prior Publication Data
US 2018/0050613 A1    Feb. 22, 2018

(30) Foreign Application Priority Data

Mar. 13, 2015   (DE) .................. 10 2015 204 655
Mar. 13, 2015   (DE) .................. 10 2015 215 367

(51) Int. Cl.
*B60N 2/235*        (2006.01)
(52) U.S. Cl.
CPC .................... *B60N 2/236* (2015.04)

(58) Field of Classification Search
USPC .......................................... 297/367 L, 367 P
See application file for complete search history.

(56) References Cited

U.S. PATENT DOCUMENTS

2010/0109408 A1*  5/2010  Ohba .................. B60N 2/2362
                                                            297/367 P
2012/0169105 A1    7/2012  Assmann et al.
(Continued)

FOREIGN PATENT DOCUMENTS

DE         196 33 782 C1      3/1998
DE    10 2005 046 807 B3     11/2006
(Continued)

*Primary Examiner* — David E Allred
(74) *Attorney, Agent, or Firm* — McGlew and Tuttle, P.C.

(57) ABSTRACT

A hardware system, for a vehicle seat, includes a fitting (10) having a first fitting part (11) and a second fitting part (12), which can be locked to one another and can rotate in relation to one another about an axis (A), a transmission rod (7) and a hand lever (5), the actuation of which rotates the transmission rod (7). The fitting is unlocked via a rotation of the transmission rod against a total characteristic torque ($M_{overall}$), produced from a sum of a first characteristic torque ($M_{35}$), generated by a spring assembly (35), and a second characteristic torque ($M_{61}$), generated by spiral springs (61). A first component (63) is rotationally fixed to the transmission rod and a second component (64) moves relative thereto during unlocking. The spiral springs (61) act between the first component (63) and the second component (64). A vehicle seat is provided having the hardware system.

19 Claims, 8 Drawing Sheets

(56) References Cited

U.S. PATENT DOCUMENTS

| | | | | |
|---|---|---|---|---|
| 2014/0132053 A1* | 5/2014 | Schuler | ............. | B60N 2/236 297/367 P |
| 2014/0157939 A1* | 6/2014 | Tomandl | ............. | B60N 2/0296 74/502.2 |
| 2014/0159458 A1* | 6/2014 | Lu | ............. | B60N 2/2356 297/366 |
| 2016/0046211 A1* | 2/2016 | Assmann | ............. | B60N 2/2356 297/361.1 |

FOREIGN PATENT DOCUMENTS

| | | |
|---|---|---|
| DE | 10 2006 015 560 B3 | 8/2007 |
| DE | 20 2009 016 989 U1 | 4/2010 |
| DE | 20 2010 015 171 U1 | 2/2011 |
| DE | 10 2011 106 285 A1 | 1/2013 |

\* cited by examiner

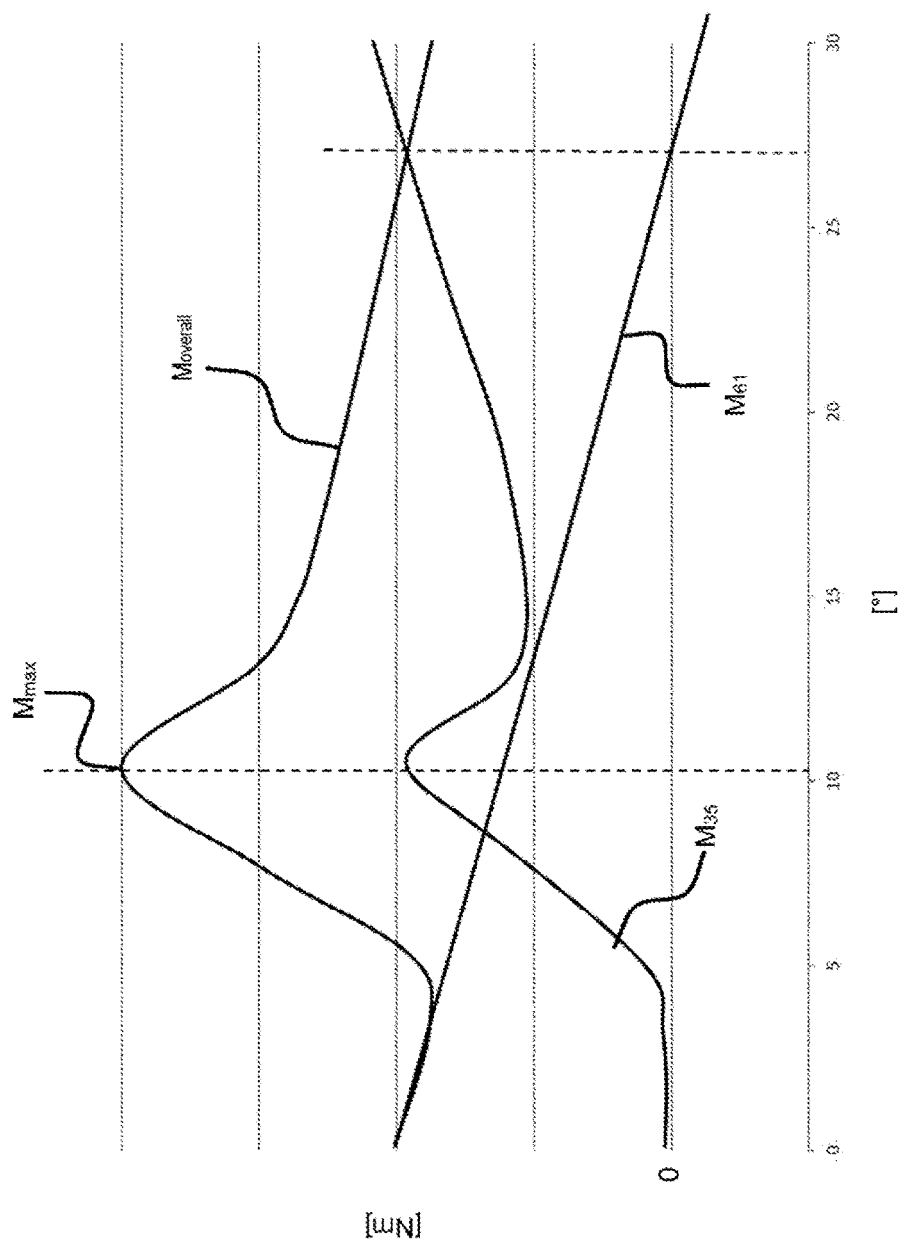

HARDWARE SYSTEM FOR A VEHICLE SEAT

CROSS REFERENCE TO RELATED APPLICATIONS

This application is a United States National Phase Application of International Application PCT/EP2016/054740, filed Mar. 7, 2016 and claims the benefit of priority under 35 U.S.C. § 119 of German Applications DE 10 2015 204 655.9 filed Mar. 13, 2015 and DE 10 2015 215 367.3 filed Aug. 12, 2015 the entire contents of which are incorporated herein by reference.

FIELD OF THE INVENTION

The invention relates to a fitting system, for a vehicle seat, in particular a motor vehicle seat, comprising at least one fitting, which has a first fitting part and a second fitting part which are lockable to each other and are rotatable relative to each other about an axis, a transmission rod and a hand lever for initiating an unlocking operation, the actuation of which hand lever rotates the transmission rod, wherein rotation of the transmission rod unlocks the fitting counter to a torque corresponding to an overall torque characteristic. The invention further relates to a vehicle seat with the fitting system.

BACKGROUND OF THE INVENTION

A fitting system of this type is known from DE 20 2010 015 171 U1. Actuation of the hand lever causes rotation of the transmission rod which, in turn, unlocks the two fittings counter to the force of the spring arrangements contained therein. The torque characteristic of the spring arrangements serving to secure the locked state runs linearly, i.e. the torque opposed to the unlocking operation rises sharply during the unlocking operation as the angle of rotation increases. In order to increase the ease of operation, a flatter profile would be advantageous. For example, it is proposed in DE 196 33 782 C1 to use a helical buckling spring for securing the locked state of the fitting system. The characteristic of said spring runs virtually independently of the unlocking path, and therefore the force which is opposed to the unlocking operation and is to be overcome by the user remains virtually constant.

In the case of a fitting system described in DE 10 2011 106 285 A1, what are referred to as shaped springs which are arranged symmetrically around the component rotating during the unlocking are used. Said shaped springs are in contact with a component rotating during the unlocking and the shape of said shaped springs and the shape of the surface of the moving part in sum produce a latching effect or a non-linear profile of the torque over the angle of rotation. The comparatively large distances of the contact between shaped springs and moving component lead here to relatively high frictional work and to a corresponding hysteresis of the entire unlocking and locking process.

SUMMARY OF THE INVENTION

The invention is based on an object of improving a fitting system of the type mentioned at the beginning, in particular of making available a better solution with comparatively shorter distances of a contact between springs and movable components and therefore lower frictional work, and of providing a corresponding vehicle seat.

This object is achieved according to the invention by a fitting system for a vehicle seat, in particular a motor vehicle seat, comprising at least one fitting which has a first fitting part and a second fitting part which are lockable to each other and are rotatable relative to each other about an axis. The vehicle seat furthermore has a transmission rod and a hand lever for initiating an unlocking operation, the actuation of which hand lever rotates the transmission rod. The fitting is unlocked by rotation of the transmission rod counter to a torque corresponding to an overall characteristic. The torque corresponding to the overall characteristic is produced from a sum of a torque generated by means of a spring arrangement and corresponding to a first characteristic and a torque corresponding to a second characteristic. According to the invention, a first component which is connected to the transmission rod for rotation therewith and a second component which is movable with respect to the first component move relative to each other during the unlocking operation. Two symmetrically arranged curved springs (also referred herein as spiral springs) are effective between the first component and the second component, producing the torque corresponding to the second characteristic.

According to the invention, by means of the symmetrical arrangement of two curved springs (spiral springs), a means is provided for the friction-free introduction of a force into the first component, said force having a desirable influence on an overall characteristic of a torque to be overcome during an unlocking operation.

By means of the symmetrical arrangement of the two, preferably C-shaped, spiral springs which are fitted into the fitting system in such a manner that the torque generated by said spiral springs follows an at least approximately second characteristic which is added to the non-linear first characteristic of the spring arrangement provided within the fitting to form the overall characteristic, the dependency of the torque to be applied by the user during the unlocking operation can be adjusted by the angle of rotation (of the transmission rod or of the hand lever). In comparison to purely linear spring characteristics, a completely different coordination of the torques in the locked and unlocked state can be set. In addition, the minimum closing torque required has a decisive effect on the overall function (dynamic load absorption, play elimination, etc.) and the maximum ergonomic unlocking forces may not be of arbitrary size.

The second characteristic can have a continuously decreasing profile, in particular a monotonously decreasing profile. Furthermore, the second characteristic can have a regressive profile which, with an initially negative gradient, decreases more shallowly or decreases less sharply as the angle of rotation increases. In this connection, by means of the second characteristic, the torque of the overall characteristic is raised comparatively sharply in a region with a low angle of rotation, while the torque of the overall characteristic is raised to a lesser extent in a region with a high angle of rotation. In the outwardly effective sum of the individual spring torques, an ergonomic unlocking operation is ultimately achieved.

The overall characteristic ($M_{overall}$) can have a maximum torque ($M_{max}$) corresponding to a predetermined angle of rotation of the transmission rod. During the unlocking operation, in accordance with the overall characteristic ($M_{overall}$) of the fitting system, as the angle of rotation of the transmission rod increases first of all an increase in the torque to be applied and to be overcome can be provided in order to give a user an unambiguously detectable resistance at the beginning of the unlocking operation. This advantageously prevents an unintentional actuation of the fitting system. The torque increases up to the maximum torque ($M_{max}$).

In this connection, it can furthermore be provided that the overall characteristic ($M_{overall}$) has a substantially decreasing profile, with an increasing differentiation of the angle of rotation from the angle of rotation corresponding to the maximum torque ($M_{max}$). In accordance with the initial increase of the torque to be applied and to be overcome at the beginning of the unlocking operation, it can likewise be provided that the overall characteristic ($M_{overall}$) of the fitting system sharply decreases from the maximum torque ($M_{max}$) as the angle of rotation of the transmission rod increases, as a result of which the torque to be applied is reduced. Owing to the fact that, in the event of an over-twisting of the angle of rotation corresponding to the maximum torque ($M_{max}$), the user cannot immediately reduce the applied actuating force at the same speed as the torque which is to be applied is reduced, it is advantageously ensured that the actuating force of the user ensures complete unlocking. The user is also given a haptic switching sensation during the actuation of the hand lever, said switching sensation approximately producing an impression of a digital switching operation between "locked" and "unlocked".

Furthermore, it can be provided that the spiral springs consist substantially of curved spring strips. The spiral springs can consist substantially of curved spring strips—in the form of leaf springs or wire springs.

All points at which, during the unlocking operation initiated by the user, there is a relative movement between a first component moved by the user and another second component which is stationary relative thereto or moved in some other way, within the entire kinematic chain of the components involved in the unlocking operation are suitable as possible positions of the spiral springs within the fitting system. Consequently, a multiplicity of points within and outside the fitting are suitable, with corresponding advantages and disadvantages for a standard component. Such a spiral spring in the interior of the fitting, for example fixed to the fitting part and in contact with the eccentric—could generally change the characteristic (torque/angle of rotation/profile) of the entire series of the fitting, but could just as readily be arranged outside the adjuster in the environment specific in each case to the customer or project in order, with different geometries, therefore also individually to realize individually different requirements imposed on the characteristic.

It is likewise possible for each of the spiral springs to be mounted in a respective receptacle of the first component. Each of the spiral springs can furthermore in each case be connected to the second component by means of a mounting plate.

Furthermore, it can be provided that a distance between two force action lines each corresponding to a direction of the force introduced into the first component by means of a respective spiral spring changes during the unlocking operation. By this means, the torque generated with the spiral springs can be influenced and/or defined with particularly simple means.

The fitting system can provide at least one further spiral spring which is arranged cyclically symmetrically with the other spiral springs with respect to the axis of the fitting. This makes it possible, by using more than two spiral springs, to use smaller spiral springs, as a result of which, in turn, a required construction space of the fitting system can be reduced in an advantageous manner.

The fitting system according to the invention is preferably used in vehicle seats for adjusting the inclination of the back rest, but can also be used at other locations. The design of the fitting in the form of a disk-shaped unit permits arbitrary changes in the angle between the fitting parts by means of the relative rotation about the axis of the fitting. The axial holding together of the fitting parts is produced in a known manner by what is referred to as a clasp ring.

According to the invention, the underlying object is likewise achieved by a vehicle seat with a seat part and a back rest which is attached by means of a previously described fitting system to the seat part, is pivotable relative to the latter and is lockable at different inclination adjustments.

The invention is explained in more detail below with reference to an advantageous exemplary embodiment illustrated in the figures. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is a characteristic diagram of the unlocking torque over the unlocking angle.

DESCRIPTION OF THE PREFERRED EMBODIMENTS

Figure 1:
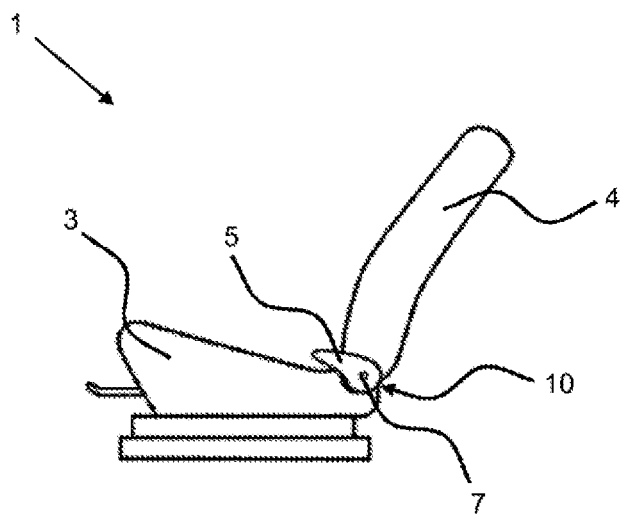
FIG. 1 is a schematic illustration of a vehicle seat.

Referring to the drawings, FIG. 1 shows a schematic illustration of a vehicle seat 1 for a motor vehicle, which has a seat part 3 and a back rest 4, the inclination of which is adjustable relative to the seat part 3. In order to adjust the inclination of the back rest 4, a transmission rod 7, which is arranged horizontally in the transition region between the seat part 3 and back rest 4, is rotated manually, for example by means of a hand lever 5. The transmission rod 7 engages with a substantially non-rotatable connection in a fitting 10 on both sides of the vehicle seat 1.

The fitting 10 has a first fitting part 11 and a second fitting part 12 which are rotatable relative to each other about an axis A. In the present case, the (imaginary) axis A is aligned with the transmission rod 7 and defines the direction indications used, which are those of a cylindrical coordinate system. The two fitting parts 11 and 12 can each be inscribed approximately into a circular disk shape. The two fitting parts 11 and 12 are preferably composed of metal, in particular steel, at least regions of which can be hardened.

The fitting 10 is designed as a latching fitting in which the first fitting part 11 and the second fitting part 12 are lockable to each other, as is described, for example, in DE 20 2009 016 989 U1, the disclosure of which in this regard is expressly incorporated.

Figure 2:
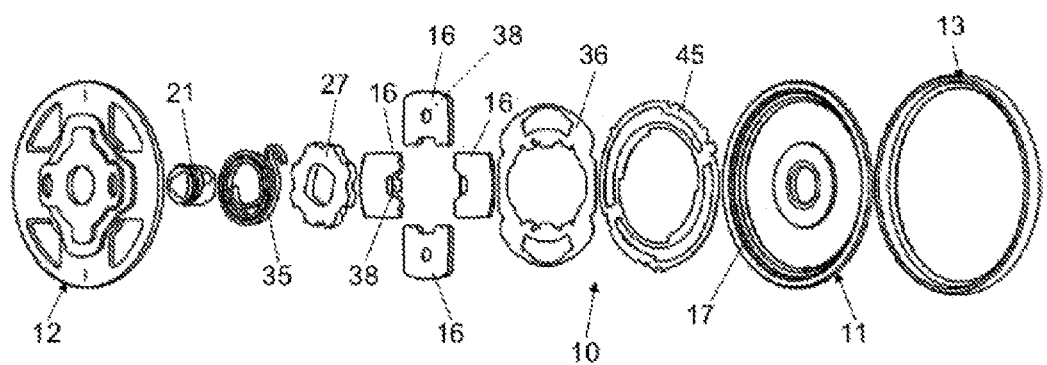
FIG. 2 is an exploded illustration of a possible configuration of a fitting.
Figure 3:
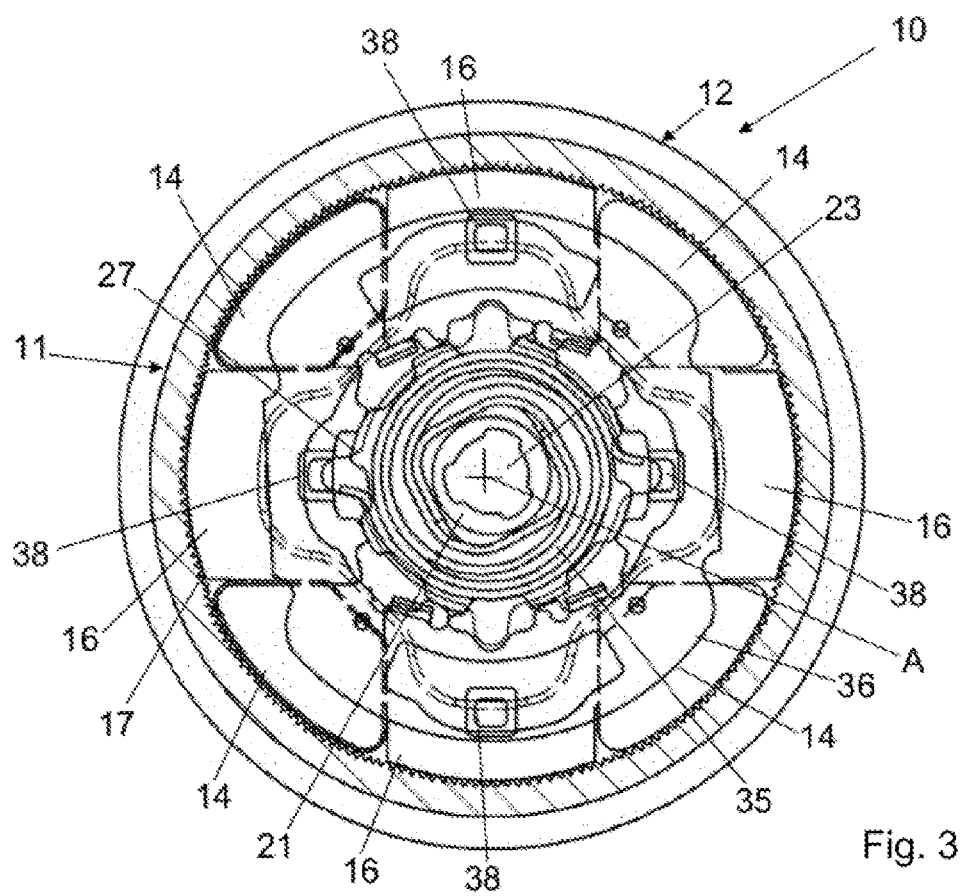
FIG. 3 is a radial sectional view through the fitting from FIG. 2, along the line XI-XI in FIG. 4.
Figure 4:
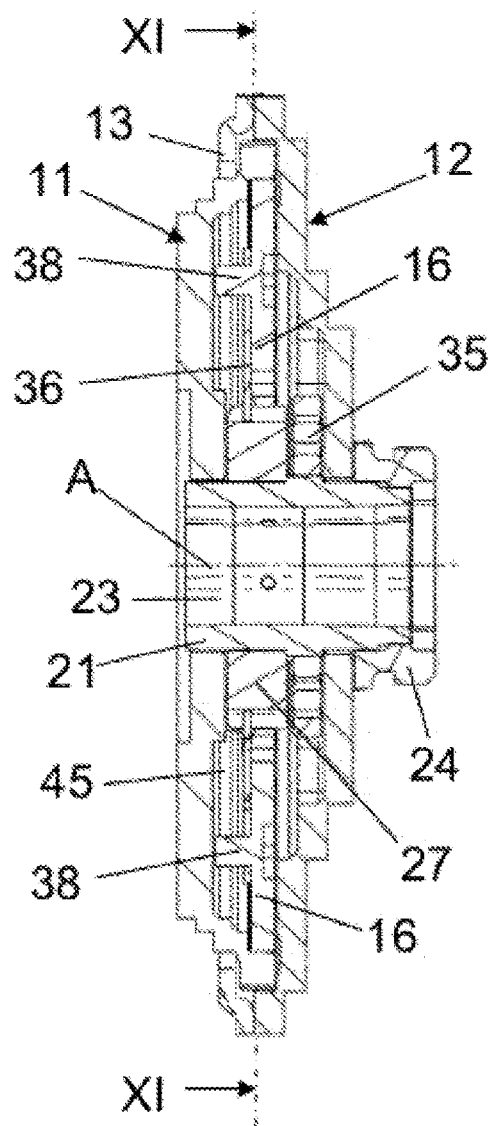
FIG. 4 is an axial section through the fitting from FIG. 2.

The illustrations of FIGS. 2 to 4 which show the general construction of a possible configuration of a fitting 10 are described together below.

The fitting 10 has a first fitting part 11 and a second fitting part 12 which are rotatable relative to each other about an axis A. In the present case, the axis A is aligned with the transmission rod 7 and defines the direction indications used, which are those of a cylindrical coordinate system. The two fitting parts 11 and 12 can each be inscribed approximately into a circular disk shape. The two fitting parts 11 and 12 are preferably composed of metal, in particular steel, at least regions of which can be hardened. To absorb the axially acting forces, i.e. to axially hold the fitting parts 11 and 12 together, a clasp ring 13 is provided. The clasp ring 13 is preferably composed of metal, in particular steel, which is preferably unhardened. The clasp ring 13 preferably has a substantially flat annular shape, but, in an alternative embodiment, may be profiled in an L-shaped manner with a cylindrical section and a flat annular section on the end side.

The clasp ring 13 is fixedly connected to one of the two fitting parts 11 and 12, in the present case in an outer annular section to the second fitting part 12, for example by means of laser welding or by means of another fastening technique known per se. By means of an inner annular section which is arranged in a plane perpendicular to the axial direction, the clasp ring 13 engages, optionally with the interposition of a sliding ring, over the first fitting part 11 in the radially outer border region thereof without obstructing the relative movement of the two fitting parts 11 and 12. In addition, the mutually facing inner surfaces of the two fitting parts 11 and 12 are protected against the penetration of foreign bodies and dirt and against damage.

The clasp ring 13 and the fitting part 11 or 12 connected fixedly thereto therefore clasp the other of the two fitting parts 11 and 12, which is movable relative thereto. In terms of construction, therefore, the two fitting parts 11 and 12 together (with the clasp ring 13) form a disk-shaped unit.

With the mounting of the fitting 10, the first fitting part 11 is for example fixedly connected to the structure of the back rest 4, i.e. is fixed to the back rest. The second fitting part 12 is then fixedly connected to the structure of the seat part 3, i.e. is fixed to the seat part. However, the associations of the fitting parts 11 and 12 can also be swapped around, i.e. the first fitting part 11 would then be fixed to the seat part and the second fitting part 12 would be fixed to the back rest. The fitting 10 lies in the force flux between the back rest 4 and the seat part 3.

The fitting 10 is designed as a latching fitting, in which the first fitting part 11 and the second fitting part 12 are lockable to each other, as described, for example, in DE 20 2009 016 989 U1, the disclosure of which in this regard is expressly incorporated.

The second fitting part 12 has guide segments 14—in the present case four such segments—which guide respective locking bars 16 laterally in the radial direction in pairs by means of straight guide surfaces. The locking bars 16—of which there is a total of four in the present case—are arranged in such a manner as to be offset relative to one another—in the present case by 90° in each case—in a construction space defined between the two fitting parts 11 and 12. The locking bars 16 are provided at the radially outer end thereof with a toothing, which can engage with (enter) a toothed ring 17 of the first fitting part 11, which is designed as an internal gear. When the toothed ring 17 and the locking bars 16 interact, the fitting 10 is locked.

The first fitting part 11 is arranged in a depression in the second fitting part 12, and the latter engages over said first fitting part radially on the outside, with the result that the two fitting parts 11 and 12 support each other. In this case, the radially outer border region of the first fitting part 11 is arranged with the toothed ring 17 in the radial direction between the guide segments 14 and the radially outer border region of the second fitting part 12 (said border region serving to support the first fitting part 11). Under high loads, for example in the event of a crash, the first fitting part 11—after a deformation—can come into contact by means of its toothed ring 17 with the guide segments 14, which are closer in the direction of load and have correspondingly (concentrically) curved surfaces in the direction of the toothed ring 17. This increases the strength of the fitting 10.

The first fitting part 11 can be mounted in the second fitting part 12. However, the conditions could be exactly the other way around, i.e. the second fitting part 12 can be mounted on the first fitting part 11. In principle, however, both arrangements are equivalent.

A driver 21, for example composed of plastic, is arranged in the center of the fitting 10 and is supported rotatably on at least one of the two fitting parts 11 and 12, in the present case the first fitting part 11, more precisely in a central opening thereof. On both sides of the vehicle seat, the driver 21 is connected in a torsionally rigid manner or at least coupled for driving purposes to the transmission rod 7, which is introduced into a bore 23 of the hollow driver 21. At one end of the driver 21, in the present case that at the second fitting part 12, a fastening ring 24 is provided, said ring being composed of plastic in the present case and preferably being fastened to the driver 21 by means of ultrasonic welding. The hand lever 5 can be firmly clipped to the fastening ring 24 in a torsionally rigid manner.

An eccentric 27, which is arranged in the construction space defined between the fitting parts 11 and 12, is seated in a torsionally rigid manner or is at least coupled for driving purposes on the driver 21. A spring arrangement 35, for example one or two spiral springs nested one in the other, is arranged in a central receptacle of one of the two fitting parts 11 and 12, in the present case of the second fitting part 12, and, in the present case, is supported on the outside. The spring arrangement 35 acts upon the eccentric 27, in the present case by being seated in a torsionally rigid manner on the driver 21 on the inside. A spring arrangement 35 of this type is described, for example, in DE 20 2009 016 989 U1, which is already mentioned above, or in DE 10 2005 046 807 B3, the disclosure of which in this regard is expressly incorporated. The eccentric 27 which is acted upon by the spring arrangement 35 acts on the radially movable locking bars 16 and acts upon the latter in such a manner that they are pushed radially outward in order to enter the toothed ring 17, thus locking the fitting 10.

A control disk 36 is arranged in the construction space axially between the locking bars 16 and the first fitting part 11 and is seated on the eccentric 27, in the present case in a torsionally rigid manner. The control disk 36 has control tracks—in the present case four such tracks—each of which interacts with a lug 38 on each locking bar 16. The lugs 38 project in the axial direction from the locking bars 16 associated therewith. Upon rotation (of a few degrees) of the driver 21—and of the eccentric 27, which is driven therewith, and of the control disk 36—counter to the force of the spring arrangement 35, the control disk 36 pulls the locking bars 16 radially inward, i.e. out of the toothed ring 17, with the result that the fitting 10 is unlocked and the two fitting parts 11 and 12 are rotatable relative to each other about the axis A. The back rest 4 is now pivotable about the axis A, in order to adjust the inclination thereof, i.e. in order to take up a different use position.

In the case of motor vehicles with two doors, the intention is to facilitate access to a rear row of seats by pivoting the back rest 4 free, for which purpose the unlocked back rest 4 is pivoted forward out of one of the use positions into a position in which it has been pivoted free and which is not suitable for use as a seat. The ease of operation is increased if the hand lever 5—or a further actuating element—does not have to be held during the entire pivoting-free process and the fittings nevertheless lock only in the position in which the back rest has been pivoted free. For this purpose, an annular pivot-free control element 45 is optionally provided in the fitting 10 around the axis A, between the control disk 36 and the first fitting part 11, as is described, for example, in DE 10 2006 015 560 B3, the disclosure of which in this regard is expressly incorporated.

The two fittings 10, the transmission rod 7 and the hand lever 5 are parts of a fitting system, to which generally at least one back rest compensation spring, preferably two back rest compensation springs which are each arranged on one of the two fittings 10, also belongs. The back rest compensation springs are part of the spring arrangement 35. The hand lever 5 can be of single-part or multi-part design, for example with a handle part and a hub part. A "stop module 50" is arranged between the hand lever 5 and the transmission rod 7, as described, for example, in DE 20 2010 015 171 U1, the disclosure of which is expressly incorporated.

Figure 5:
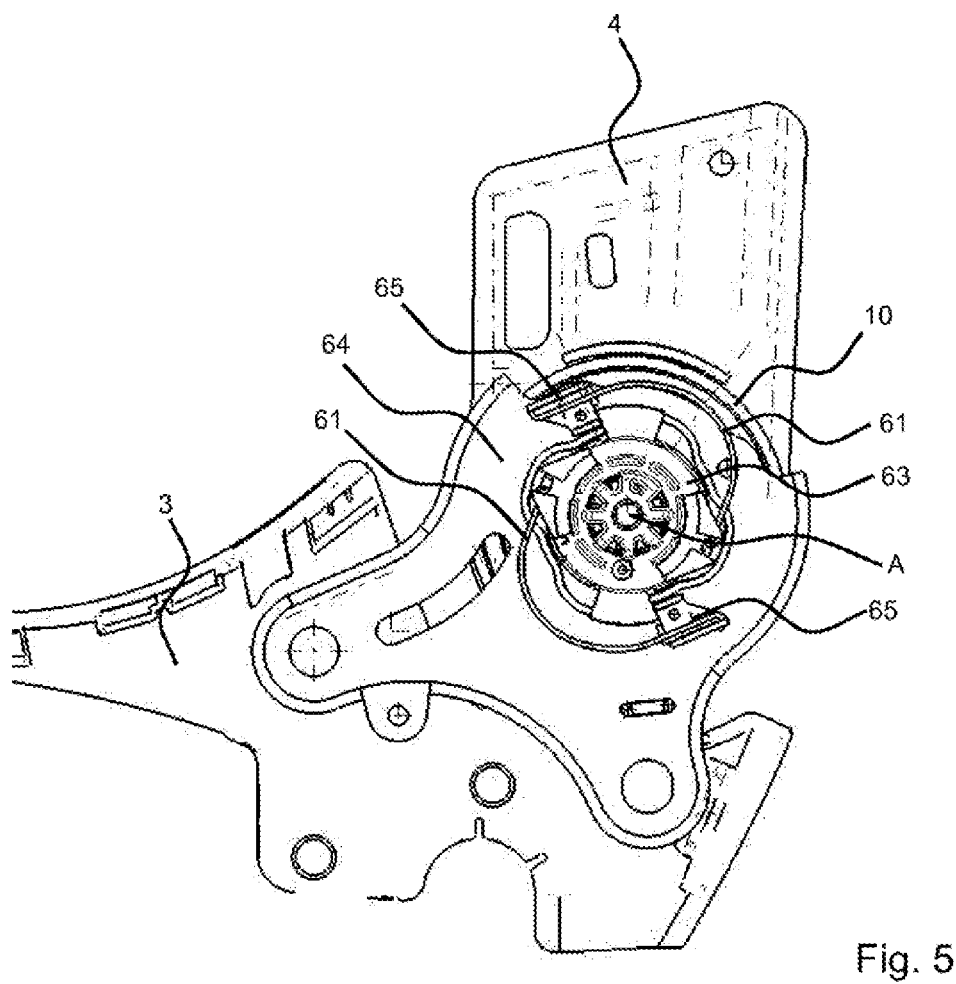
FIG. 5 is an illustration of an exemplary embodiment of the invention.
Figure 6:
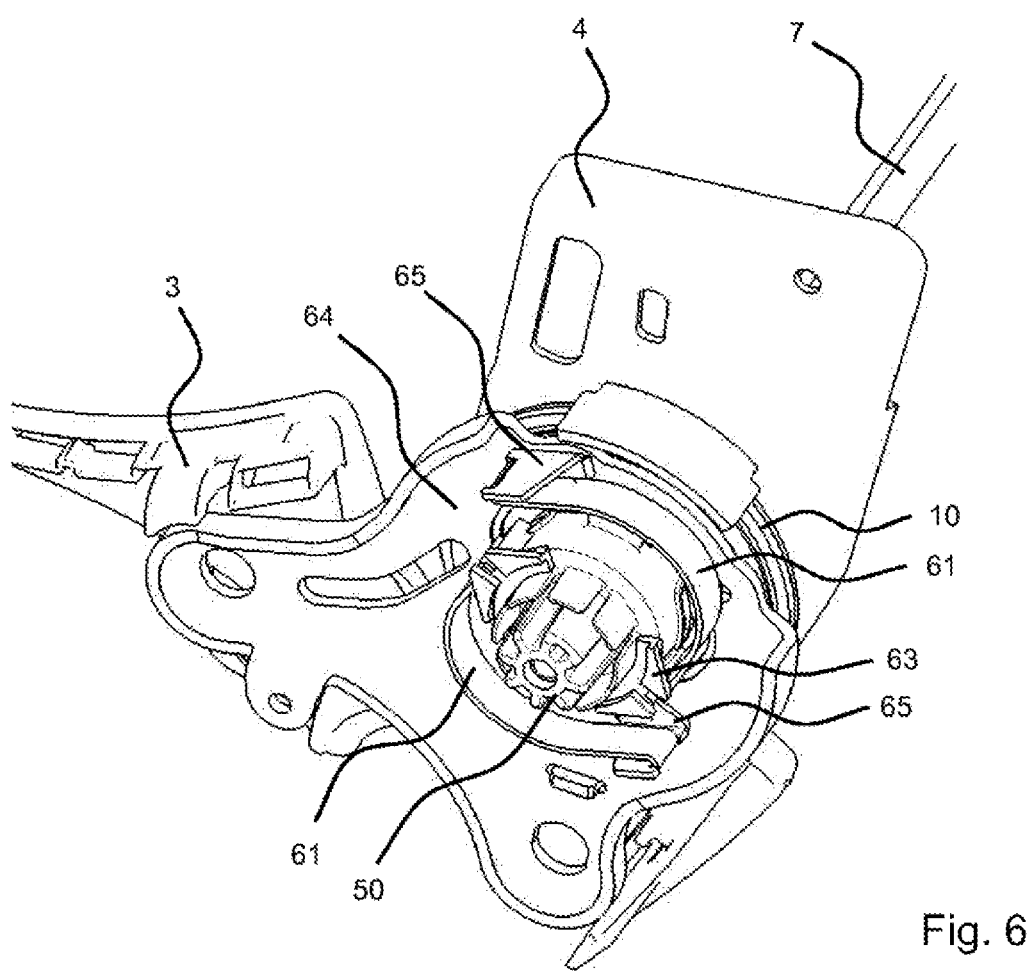
FIG. 6 is a perspective view of the illustration from FIG. 5.
Figure 7:
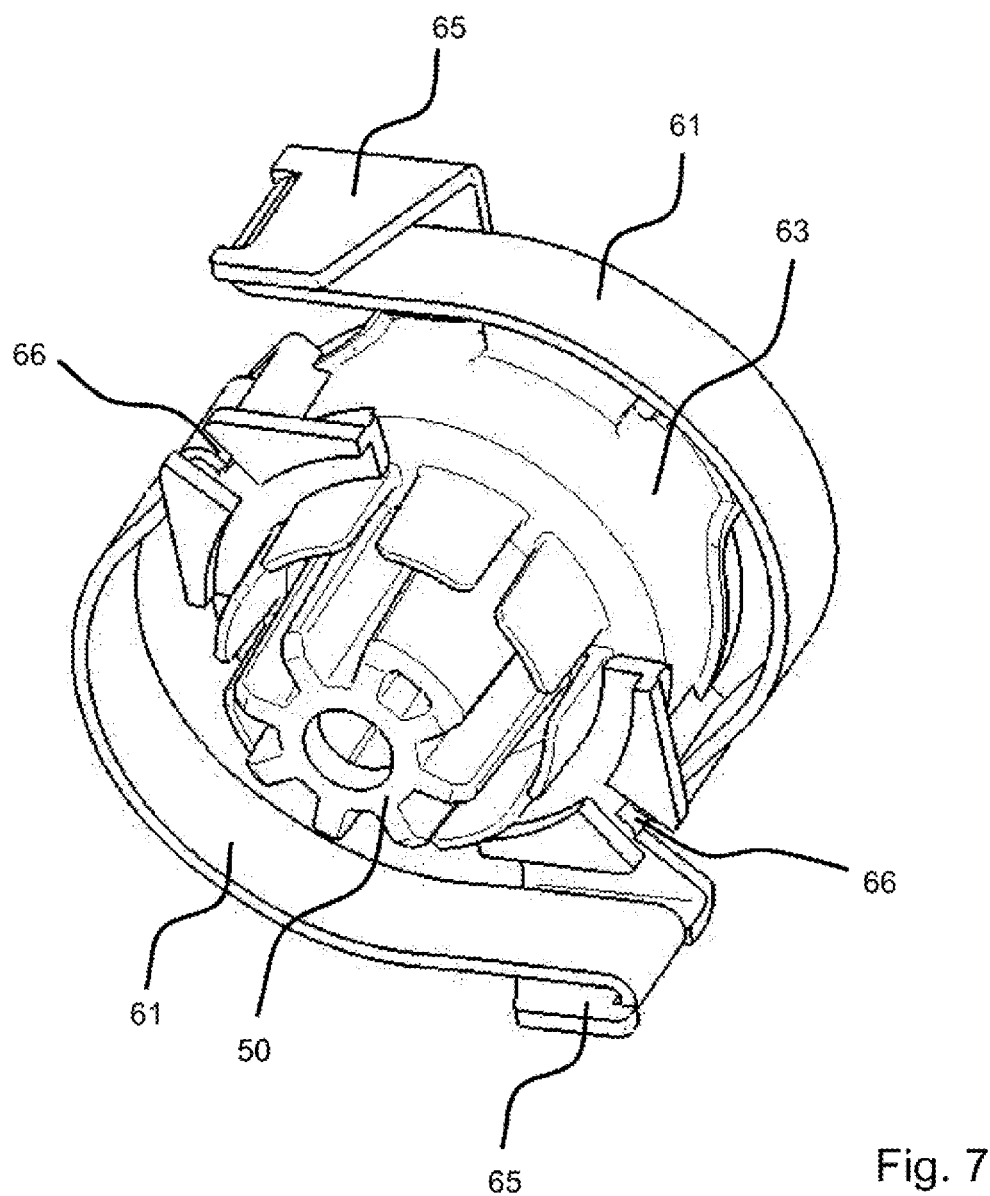
FIG. 7 is a perspective partial view of the exemplary embodiment in a locked starting position.

An illustration of an exemplary embodiment of the invention is shown in a frontal view in FIG. 5 and in a perspective view in FIG. 6. FIG. 7 shows a perspective partial view of an exemplary embodiment in a locked starting position. FIGS. 5, 6 and 7 are described together below. The back rest 4 (indicated in sections) and a likewise schematically illustrated side part of the seat part 3, which are coupled to each other in alignment with the axis A, are shown. A transmission rod 7 which forms a connection transmitting rotational force between the hand lever 7 or the stop module 50 and the optionally one or two provided fittings 10 furthermore runs in alignment with the axis A. The fitting system furthermore has a second component 64 which is arranged on the outside, as viewed relative to the center plane of the back rest 4, and which in the present case is formed by an adapter plate for connection to a side part of the seat part 3. A first component 63 which is mounted rotatably with respect to the second component 64 is arranged on said second component 64 coaxially and/or aligned with the axis A. In the present case, the first component is designed as part of the stop module 50, but can likewise be configured independently thereof.

Two mounting plates 65 which are arranged opposite each other relative to the axis A are provided on the second component 64. In the present case, the mounting plates 65 are fixedly connected to the second component 64, in particular connected in an integrally bonded manner, preferably by means of a welding process. Alternatively, the mounting plates 65 can be formed in one piece with the second component 64, in particular made out of the material of the second component 64. Furthermore, the first component 63 has two receptacles 66 likewise arranged lying opposite each other relative to the axis A. In the present case, the receptacles 66 are molded onto the first component 63 or are formed integrally therewith.

A spiral spring 61 is clamped between a respective mounting plate 65 and a respective receptacle 66. The embodiment illustrated here has precisely two cyclically symmetrically arranged spiral springs 61. In the case (not illustrated) of an embodiment with more than two spiral springs 61, a corresponding number of mounting plates 65 and receptacles 66 should likewise be provided which are all arranged cyclically symmetrically relative to the axis A, preferably distributed uniformly in the circumferential direction. The spiral springs 61 engage around the first component 63, as viewed from the respective receptacle 66, approximately as far as the opposite side.

Figure 8:
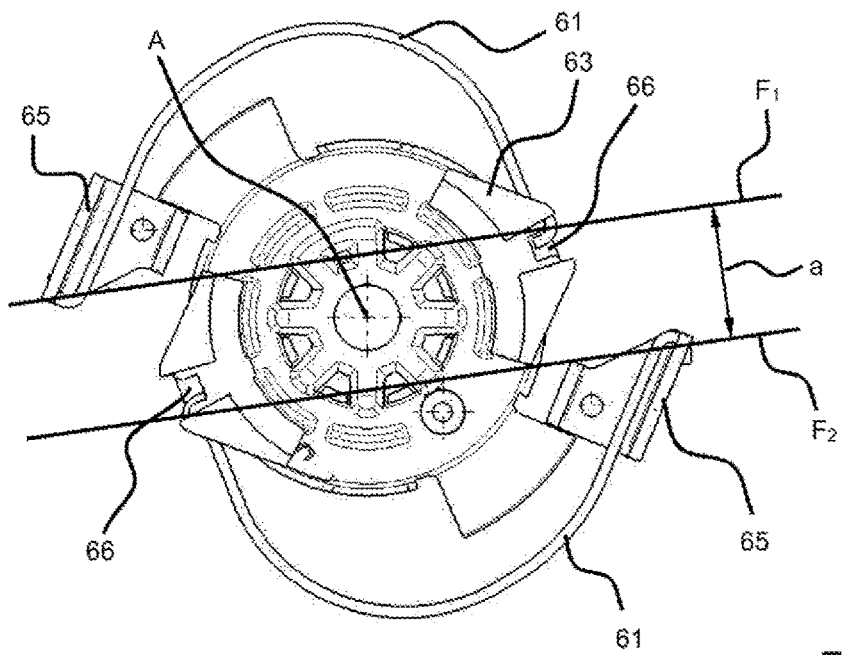
FIG. 8 is a partial view of the exemplary embodiment from FIG. 7 in the locked starting position.
Figure 9:
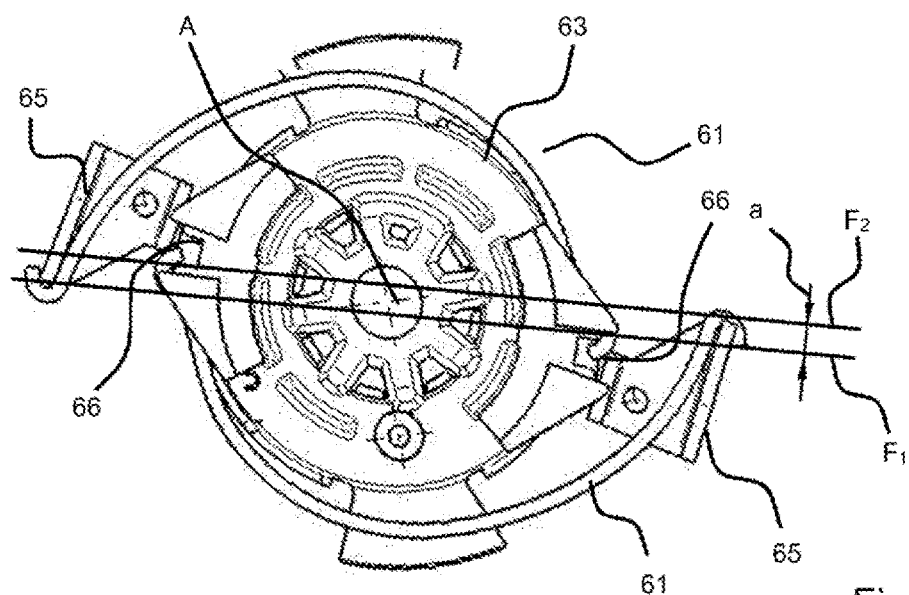
FIG. 9 is a partial view of the exemplary embodiment from FIG. 7 in an unlocked position.

FIG. 8 shows the exemplary embodiment from FIG. 7 in the locked starting position in a frontal partial view, whereas FIG. 9 shows a frontal partial view of the exemplary embodiment from FIG. 7 in the unlocked position.

FIG. 8 shows a force action line F1, F2 for each of the two spiral springs 61 of the fitting system. Each of the force action lines F1, F2 corresponds to the direction of the force which is introduced into the first component 63 by means of the respective spiral spring 61 at the respective receptacle 66. A distance a between two force action lines F1, F2 which each correspond to a direction of the force introduced into the first component 63 by means of a respective spiral spring 61 changes during the unlocking operation, as is clarified in the comparison of FIGS. 8 and 9. In the event of more than two spiral springs 61, it is generally equally meaningful, instead of the distance a between the force action lines F1, F2, to consider a distance between one force action line F1, F2 in each case and the center point of the axis A in proportion to a resulting torque.

In the locked state according to FIG. 8, the two force action lines F1, F2 have a comparatively large distance a which brings about a correspondingly high torque because of the lever arm which is therefore formed. The torque causes locking or securing of the locked state of the fitting 10.

In comparison to the illustration from FIG. 8, in the unlocked state according to FIG. 9 the fitting system has a very small distance a between the force action lines F1, F2. Furthermore, by rotation of the first component 63, the two force action lines F1 and F2 have crossed over and now run relative to each other on the other side in each case. By the two force action lines F1 and F2 crossing over at what is referred to as a dead center position, in which the two force action lines F1 and F2 are arranged on a common straight line through the axis A and the distance therebetween is therefore equal to zero, a reversal of the force takes place. The reversal of the force means that the torque exerted on the first component 63 by means of the spiral springs 61 is reversed in its direction or, by means of this torque, the first component 63 is loaded in a reversed direction of rotation about the axis A.

The spiral springs 61 have an assisting action on the unlocking operation when the fitting 10 is unlocked after the dead center position. As viewed from the starting position, the spiral spring 61 therefore opposes the force of the spring arrangement 35 on the far side of the dead center position and accordingly the torque of the spring arrangement 35, as a result of which a force to be applied by a user for keeping the fitting 10 open is considerably reduced. Nevertheless, even after overtwisting of the angle of rotation corresponding to the dead center position, a positive torque remains corresponding to the overall characteristic $M_{overall}$ in order to ensure that the fitting system is always independently locking.

FIG. 10 shows a characteristic diagram of the unlocking torque over the unlocking angle. The graphs illustrated should be understood exclusively as purely schematic sketches and expressly do not correspond to any reproduction which is true to scale. Similarly, the schematic graphs which are illustrated are not based on actual measurement results.

A nonlinear first characteristic $M_{35}$ corresponding to a torque generated by the spring arrangement 35 preferably initially rises comparatively sharply or runs steeply upward from an angle of rotation of 0°, corresponding to the locked state of the fitting, in the event of an unlocking torque in the vicinity of zero, i.e. at a very low value. This means that the spring arrangement 35 initially opposes the unlocking operation and endeavors to maintain the locked state, in particular also to prevent inadvertent unlocking. After a subsequent temporary drop, the first characteristic $M_{35}$ rises progressively further with an advancing angle of rotation.

A second characteristic $M_{61}$ of the torque generated by the spiral springs 61 originates from an angle of rotation of the first component 63 of 0°, corresponding to the locked state of the fitting 10, at a predetermined positive torque, with, for example, an absolute value of approximately 3 to 4 Nm, and, as the unlocking angle of rotation increases, runs in a continuously dropping manner, or regressively. This means that, during the unlocking operation, i.e. as the angle of rotation increases, a resulting force of the spiral springs 61 decreases from the beginning. A corresponding negative gradient of the second characteristic $M_{61}$ of the spiral springs 61 can be set by a corresponding configuration of the spiral springs 61.

At an angle of rotation corresponding to the dead center position, in the present case at an angle of rotation of, for example, approx. 27°, the absolute value of the torque of the spiral springs 61 is equal to zero and the value of the first characteristic $M_{35}$ corresponds to the value of the overall characteristic $M_{overall}$.

During the unlocking operation of the fitting system, the user has to overcome the torque corresponding to the overall characteristic $M_{overall}$ that arises additively from the torque according to the first characteristic $M_{35}$ of the spring arrangement 35 provided in the fitting 10 and the torque according to the second characteristic $M_{61}$ of the spiral springs 61 provided in the fitting system. The spring arrangement 35 has a torque with a nonlinear first characteristic $M_{35}$. The nonlinear portion, which is provided by the spring arrangement 35, on the overall characteristic $M_{overall}$ is therefore added to the second characteristic $M_{61}$ of the torque generated by the two spiral springs 61, thus resulting in the desired profile of the overall characteristic $M_{overall}$, as is illustrated in FIG. 10.

The overall characteristic $M_{overall}$ has a maximum torque $M_{max}$ at an angle of rotation of the first component 63 of approx. 10.5° in the present case. During the unlocking operation, first of all an increase of the torque to be applied and to be overcome is provided in accordance with the overall characteristic $M_{overall}$ of the fitting system, as the angle of rotation increases within the range of 0° to 10.5° of the first component 63. After the angle of rotation of 10.5° in the present case is reached and the maximum torque $M_{max}$ is correspondingly reached, upon further rotation of the first component 63 the torque falls again in accordance with the overall characteristic $M_{overall}$, i.e. when there is an increase in the angle of rotation.

By an individual design of the spring arrangement 35 and consequently of the first characteristic $M_{35}$, the overall characteristic $M_{overall}$ arising in sum with the second characteristic $M_{61}$ of the spiral springs 61 can be predetermined in such a manner that different profiles of the overall characteristic $M_{overall}$ can be constructed in order to produce the dependency of the torque to be applied by the user in dependence on the angle of rotation in a desired manner.

The features disclosed in the above description, the claims and the drawings may be of significance both individually and also in combination for implementing the invention in its various refinements.

Although the invention has been described in detail in the drawings and the previous illustration, the illustrations should be understood as illustrative and by way of example and non-limiting. In particular, the selection of the graphically illustrated proportions of the individual elements should not be interpreted as required or restricting. Furthermore, the invention is in particular not restricted to the exemplary embodiments explained. Further variants of the invention and the realization thereof are apparent to a person skilled in the art from the above disclosure, the figures and the claims.

Terms such as "comprise", "have", "include", "contain" and the like used in the claims do not exclude further elements or steps. The use of the indefinite article does not exclude a plurality.

While specific embodiments of the invention have been shown and described in detail to illustrate the application of the principles of the invention, it will be understood that the invention may be embodied otherwise without departing from such principles.

The invention claimed is:

1. A fitting system for a vehicle seat, the fitting system comprising:
    at least one fitting comprising a first fitting part and a second fitting part which are lockable to each other and are rotatable relative to each other about an axis;
    a transmission rod;
    a hand lever for initiating an unlocking operation, the actuation of which hand lever rotates the transmission rod;
    a spring arrangement;
    two symmetrically arranged curved springs, wherein rotation of the transmission rod unlocks the fitting counter to a torque following an overall torque characteristic curve wherein the torque following the overall torque characteristic curve is produced from a sum of a torque generated by means of the spring arrangement and following a first torque characteristic curve and a torque generated by means of the two symmetrically arranged curved springs following a second torque characteristic curve;
    a first component which is connected to the transmission rod for rotation therewith; and
    a second component which is movable with respect to the first component, and wherein the first component and the second component move relative to each other during the unlocking operation, wherein the two symmetrically arranged curved springs are effective between the first component and the second component, producing the torque corresponding to the second torque characteristic curve with a strictly monotone decreasing profile in the entire range of an angle of rotation of the first component between 0 and 30 degree.

2. The fitting system as claimed in claim 1, wherein the overall torque characteristic curve has a maximum torque corresponding to a predetermined angle of rotation of the transmission rod.

3. The fitting system as claimed in claim 2, wherein the overall torque characteristic curve has a substantially decreasing profile, with an increasing differentiation of the angle of rotation from the predetermined angle of rotation corresponding to the maximum torque.

4. The fitting system as claimed in claim 1, wherein the curved springs consist substantially of curved spring strips.

5. The fitting system as claimed in claim 4, wherein the curved springs are C-shaped curved springs.

6. The fitting system as claimed in claim 1, wherein each of the curved springs is mounted in a respective receptacle of the first component.

7. The fitting system as claimed in claim 1, wherein each of the curved springs is in each case connected to the second component by means of a mounting plate.

8. The fitting system as claimed in claim 7, wherein the mounting plates are connected to the second component in an integrally bonded manner.

9. The fitting system as claimed in claim 8, wherein the mounting plates are connected to the second component by means of a welding process.

10. The fitting system as claimed in claim 1, wherein a distance between two force action curves, each corresponding to a direction of the force introduced into the first component by means of a respective curved spring, changes during the unlocking operation.

11. The fitting system as claimed in claim 1, wherein the curved springs are arranged identically distributed in the circumferential direction.

12. A vehicle seat comprising:
a seat part;
a fitting system; and
a back rest which is attached by means of the fitting system and is pivotable relative to the latter and is lockable with different inclination adjustments, wherein the fitting system comprises:
at least one fitting comprising a first fitting part and a second fitting part which are lockable to each other and are rotatable relative to each other about an axis;
a transmission rod;
a hand lever for initiating an unlocking operation, the actuation of which hand lever rotates the transmission rod;
a spring arrangement;
two symmetrically arranged curved springs, wherein rotation of the transmission rod unlocks the fitting counter to a torque corresponding to an overall torque characteristic curve wherein the torque of the overall torque characteristic curve is produced from a sum of a torque generated by means of the spring arrangement and following a first torque characteristic curve and a torque generated by means of the two symmetrically arranged curved springs following a second torque characteristic curve;
a first component which is connected to the transmission rod for rotation therewith; and
a second component which is movable with respect to the first component and wherein the first component and the second component move relative to each other during the unlocking operation, wherein the two symmetrically arranged curved springs are effective between the first component and the second component, producing the torque corresponding to the second torque characteristic curve with a strictly monotone decreasing profile in the entire range of an angle of rotation of the first component between 0 and 30 degree.

13. The vehicle seat as claimed in claim 12, wherein the overall torque characteristic curve has a maximum torque corresponding to a predetermined angle of rotation of the transmission rod.

14. The vehicle seat as claimed in claim 13, wherein the overall torque characteristic curve has a substantially decreasing profile, with an increasing differentiation of the angle of rotation from the predetermined angle of rotation corresponding to the maximum torque.

15. The vehicle seat as claimed in claim 12, wherein the curved springs each comprise a curved spring strip.

16. The vehicle seat as claimed in claim 12, wherein the curved springs each comprise a C-shaped spring strip.

17. A vehicle seat fitting system comprising:
a fitting comprising a first fitting part and a second fitting part which are lockable to each other and are rotatable relative to each other about an axis;
a transmission rod;
a hand lever for rotating the transmission rod to initiating an unlocking;
a spring arrangement;
two symmetrically arranged curved springs;
a first component connected to the transmission rod for rotation therewith; and
a second component movable with respect to the first component, wherein:
the transmission rod rotates to unlock the fitting counter to an overall torque generated by the spring arrangement and the two symmetrically arranged curved springs;
the spring arrangement generates a spring arrangement torque following a spring arrangement torque force to transmission rod angular position relationship;
the first component is moveable relative to the second component;
the two symmetrically arranged curved springs act between the first component and the second component generating a two symmetrically arranged curved springs torque;
the overall torque follows an overall torque to transmission rod angular position relationship produced from a sum of the spring arrangement torque and the two symmetrically arranged curved springs torque; and
the two symmetrically arranged curved springs torque follows a torque force to transmission rod angular position relationship with a strictly monotone decreasing profile in the entire range of an angle of rotation of the first component relative to the second component between 0 and 30 degrees.

18. The fitting system as claimed in claim 17, wherein the overall torque to transmission rod angular position relationship has a maximum torque at a predetermined angle of rotation of the transmission rod.

19. The fitting system as claimed in claim 18, wherein the overall torque to transmission rod angular position relationship has a substantially decreasing profile, with an increasing differentiation of angle of rotation from the predetermined angle of rotation at the maximum torque.

* * * * *